No. 870,081. PATENTED NOV. 5, 1907.
L. A. BRENIZER.
RIDING ATTACHMENT FOR HARROWS.
APPLICATION FILED FEB. 23, 1907.
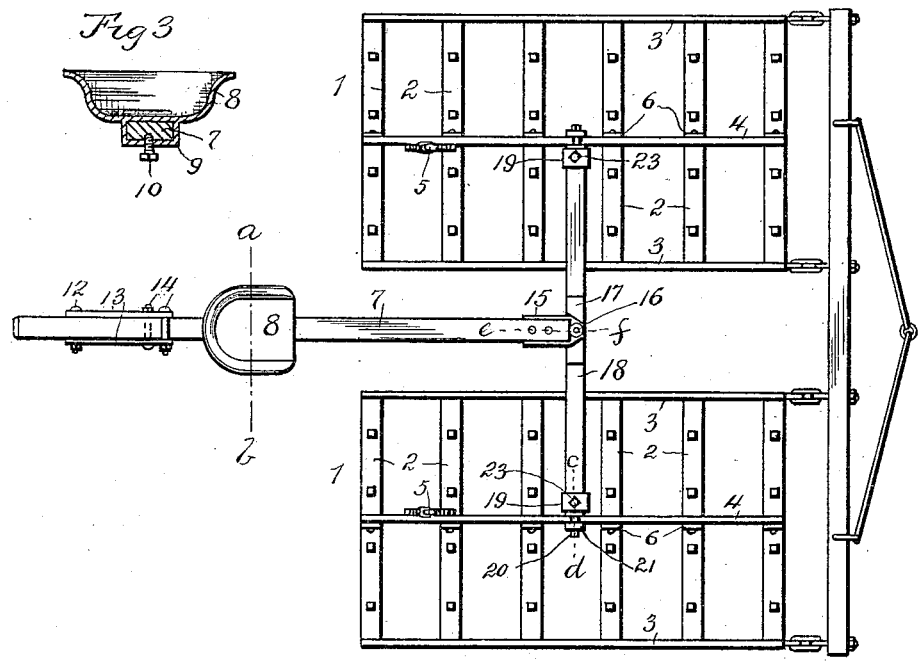
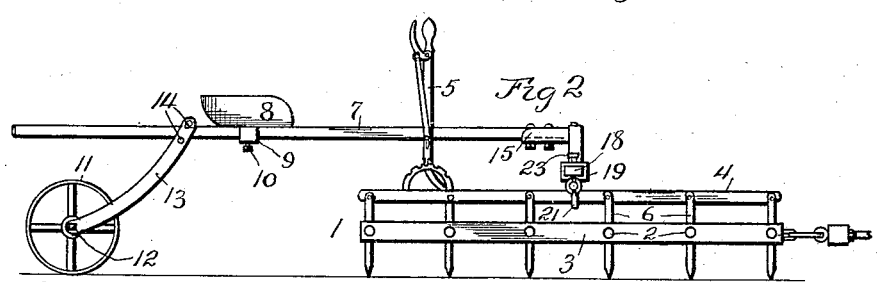
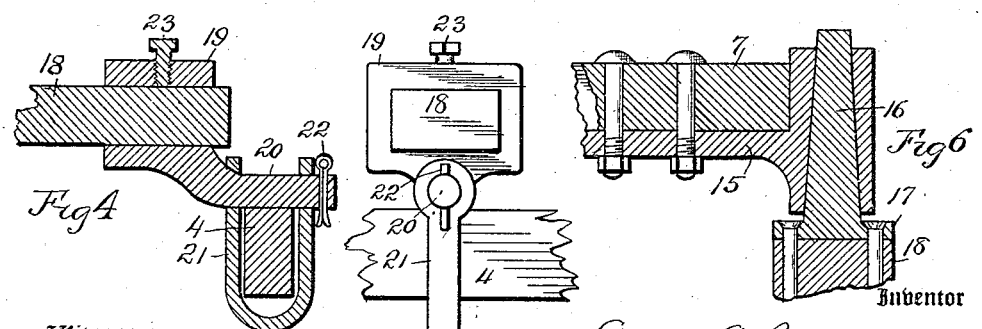

UNITED STATES PATENT OFFICE.

LOAMA A. BRENIZER, OF MIAMI, MISSOURI.

RIDING ATTACHMENT FOR HARROWS.

No. 870,081.     Specification of Letters Patent.     Patented Nov. 5, 1907.

Application filed February 23, 1907. Serial No. 358,871.

*To all whom it may concern:*

Be it known that I, LOAMA A. BRENIZER, a citizen of the United States, residing at Miami, in the county of Saline and State of Missouri, have invented certain new and useful Improvements in Riding Attachments for Harrows, of which the following is a specification.

My invention relates to improvements in riding attachments for harrows.

The object of my invention is to provide a riding attachment that may be readily affixed to such harrows as ordinarily are not provided with seats for supporting the operator of the harrow.

My invention is particularly adapted for attachment to a harrow of the type having adjustable teeth and a lever for shifting the teeth to different angles.

My invention provides a seat supporting bar attached to the harrow and having a wheeled support, a seat being mounted on the bar in position in which the occupant of the seat may reach and operate the lever.

My invention provides further the pivoting of the seat supporting bar to the harrow so that the bar may be swung laterally by the occupant of the seat so as to avoid obstructions, and also affording a construction permitting the easy turning of the harrow.

My invention provides further a seat adjustable lengthwise of the supporting bar so that the occupant of the seat may be positioned so that he may readily reach and operate the tooth shifting lever.

Other novel features of my invention are hereinafter fully described and claimed.

In the accompanying drawings illustrative of my invention, Figure 1 is a plan view of a double toothed harrow provided with my riding attachment. Fig. 2 is side elevation view of what is shown in Fig. 1. Fig. 3 is a cross section taken on the dotted line *a—b* of Fig. 1. Fig. 4 is a vertical sectional view taken on the dotted line *c—d* of Fig. 1, showing the adjustable securing device. Fig. 5 is an end view of what is shown in Fig. 4. Fig. 6 is a vertical sectional view taken on the dotted line *e—f* of Fig. 1.

Similar characters of reference denote similar parts.

1 denotes each of two sections of a double section toothed harrow of the type having transverse tooth bars 2 pivoted to longitudinal beams 3. On each section is mounted a longitudinal horizontal bar 4 to which is pivoted a lever 5, the bar 4 having pivoted to it the upper ends of the upwardly extending arms 6 secured to the tooth bars 2.

The harrow above described and illustrated in the drawings is of the ordinary type and its construction forms no part of my invention, but it is illustrated and described for the purpose of making clear the application of my riding attachment.

7 denotes a longitudinal horizontal rearwardly extending seat supporting bar, preferably having its forward end pivoted to the harrow, and supported at its rear end by a support, preferably a wheeled support, which is capable of adjustment lengthwise of the seat supporting bar 7. On the bar 7 is carried a seat 8 which is preferably adjustable lengthwise of the bar 7 so that the occupant of the seat may readily grasp and operate the tooth shifting levers 5. In its preferred form the seat 8 has on its under side a U shaped projection 9 through which the bar 7 extends. A set screw 10 is mounted in a vertical screw threaded hole in the horizontal portion of the U shaped projection 9 and can be turned so as to tightly clamp the bar 7 to the seat 8.

The adjustable wheeled support comprises preferably the following described parts:—11 denotes a carrying wheel adapted to travel on the ground and rotatively mounted on a transverse horizontal pin 12 secured to the lower ends of two upwardly extending parallel bars 13. The upper ends of said two bars 13 are provided each with two transverse openings disposed one above the other and having mounted therein two transverse members or bolts 14 disposed respectively above and below the bar 7 and adjustable lengthwise of said bar. The bars 13 extend forwardly as well as upwardly from the pin 12, so that the weight of the bar 7 forces the forward ends of the bars 13 downwardly thus causing the bolts 14 to tightly clamp the upper and lower sides of the bar 7, and, therefore, holding the wheeled support in the position in which it may be adjusted on the bar 7. The seat 8 is adjusted so as to place the occupant within easy reach of the levers 5, and the wheeled support is adjusted so as to afford the springing vertical movement desired in the bar 7.

The preferable means for securing the bar 7 to the harrow comprises the following described mechanism. To the forward end of the bar 7 is secured a plate 15 provided with a vertical hole in which is pivotally mounted a vertical projection 16, preferably of conical form, on the horizontal plate 17, which plate 17 is secured to the upper side of a horizontal transverse bar 18 which extends over the two sections of the harrow. Means preferably adjustable lengthwise on the bar 18 are provided for securing the said bar to the two sections of the harrow. Such adjustable securing means comprise each a member 19 provided with a hole in which is lengthwise adjustable the bar 18. The member 19 is provided with a horizontal projection 20 which extends through the holes in the two arms of a clevis 21 which embraces the adjacent lever operated bar 4. Through the projection 20 outside the clevis 21 is provided a hole in which is mounted a cotter pin 22. A set screw 23 is mounted in a screw threaded hole provided in each member 19, said set screw bearing against the bar 18.

In attaching the riding attachment to a harrow of the type described, the clevises 21 are affixed to the bars 4, after which the members 19 are moved longitudinally on the bar 18 to positions in which the projections 20 enter the holes in the clevis arms. The cotter pins 22 are then inserted through the projections 20. The plate 15 on the bar 7 is then pivoted to the projection 16 on the plate 17. The operator then adjusts the seat 8 and wheeled support to the positions desired on the bar 7.

My invention may be modified in many ways within the scope of the appended claims without departing from its spirit.

Having thus described my invention, what I claim and desire to secure by Letters Patent, is:—

1. In a riding attachment for harrows, the combination with a seat supporting bar, of means for pivoting said bar to the harrow so that the bar may swing laterally, a seat mounted on said bar, a supporting wheel, a support to which said wheel is rotatively secured, said support having two transverse members disposed one above the other and slidably engaging respectively the upper and lower sides of said bar for supporting the free end of said bar.

2. In a riding attachment for harrows, the combination with a seat supporting bar, of means for pivoting said bar to the harrow so that the bar may swing laterally, a seat adjustable lengthwise on said bar, a supporting wheel, and a support pivoted to said wheel and provided with two transverse members disposed one above the other and engaging respectively the upper and lower sides of said bar and adjustable with said support lengthwise of said bar.

3. In a riding attachment for harrows, the combination with a seat supporting bar, of a supporting member to which said bar is pivoted so as to swing laterally, means adjustable lengthwise of said member for securing said member to the harrow, a seat mounted on said bar, a support having two transverse members disposed one above the other and respectively engaging the upper and lower sides of the seat supporting bar and adjustable with said support lengthwise of said bar, and a wheel rotatively mounted on and carrying said support.

In testimony whereof I have signed my name to this specification in presence of two subscribing witnesses.

LOAMA A. BRENIZER.

Witnesses:
R. D. HETAFFRE,
GEO. E. JETT.